T. W. BEAN & T. J. HENNESSY.
APPARATUS AND METHOD OF CURING ARTICLES OF RUBBER AND FABRIC.
APPLICATION FILED JULY 5, 1917.
1,283,630.
Patented Nov. 5, 1918.
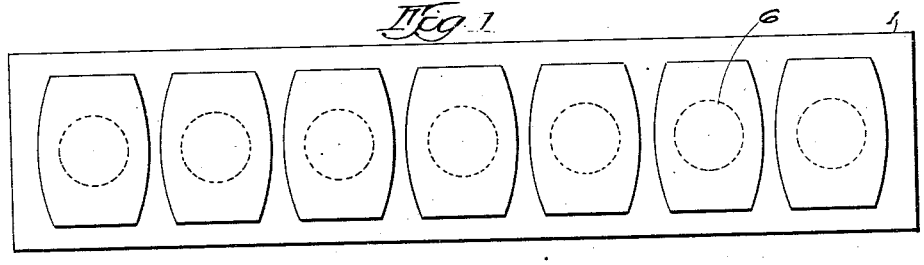
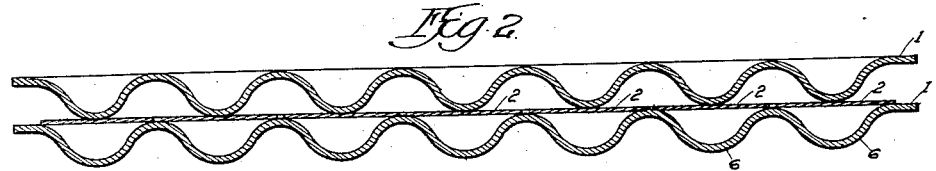
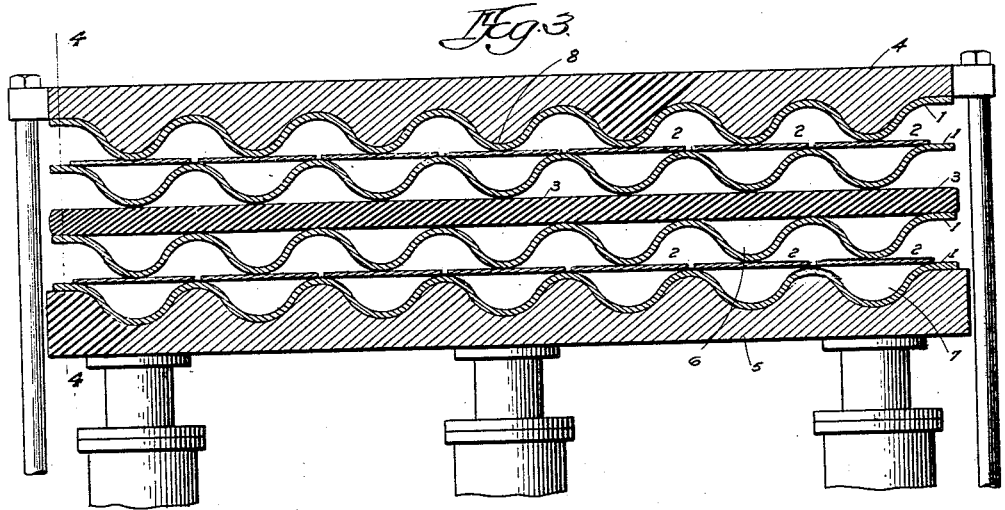
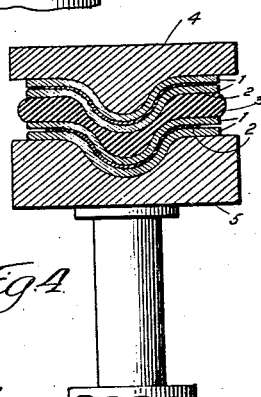
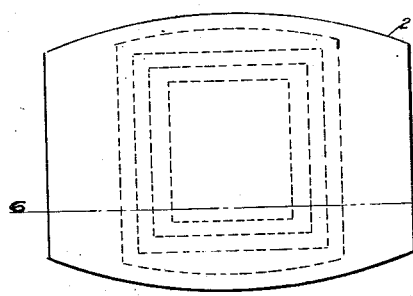
Inventors
Thomas W. Bean
Thomas J. Hennessy

UNITED STATES PATENT OFFICE.

THOMAS W. BEAN AND THOMAS J. HENNESSY, OF AKRON, OHIO, ASSIGNORS TO THE FIRESTONE TIRE AND RUBBER COMPANY, OF AKRON, OHIO, A CORPORATION OF OHIO.

APPARATUS AND METHOD OF CURING ARTICLES OF RUBBER AND FABRIC.

1,283,630.  Specification of Letters Patent.  Patented Nov. 5, 1918.

Application filed July 5, 1917. Serial No. 178,593.

*To all whom it may concern:*

Be it known that we, THOMAS W. BEAN and THOMAS J. HENNESSY, citizens of the United States, residing at Akron, in the county of Summit and State of Ohio, have invented certain new and useful Improvements in Apparatus and Methods of Curing Articles of Rubber and Fabric, of which the following is a specification.

This invention relates to the method of and apparatus for manufacturing, what is known to the trade as, inside blow-out patches. By inside blow-out patch is meant, a patch that can be placed within a pneumatic tire casing to cover a blow-out, or hole, in the same.

These patches are concave-convex in the form of the inside of a tire casing. As a rule, they are slightly elongated. They are built up of a series of layers of rubberized fabric, similar to the fabric used in an automobile tire. It is the practice to build said patches with a large sized piece of fabric and then place thereon a series of layers each succeeding piece of fabric being smaller in size and applied to the center of the large or base piece. The fabric used in these patches is rubberized and, when said patches are vulcanized and are used in a tire, they give practically the same cushioning and resiliency that a tire itself gives.

Heretofore, these patches have been made and vulcanized, by first putting them on a core and wrapping them thereto with tape. They were then cured while on the core, and took the shape of the core, which was tire shaped. It has been found that this proves to be a slow and costly method. Steam presses similar to that of applicant's have also been used for this purpose. But, in using the steam presses, the patches were put directly on the cast iron plates of the press, and buckled and ruined patches were frequently made.

It has been found that the foregoing methods have either proved slow or costly, and the present invention has for its main object to provide a simple, quick and inexpensive method of curing patches and at the same time producing a perfect article. From the following description and the accompanying drawings, it will readily be seen that the present invention is a much improved method.

In the accompanying drawings, Figure 1 is a plan view of a heavy fabric form or blanket used to give the patches their correct shape. Fig. 2 is a side view of two of these fabric forms, taken in section, with patches interposed between the same. Fig. 3 is a side view, taken in section, showing the fabric forms and patches in a steam press, ready to be cured. Fig. 4 is an end view, the press being compressed and the patches pressed in, to conform to the shape of the blankets. Fig. 5 is a plan of one of the patches, the different layers of fabric being shown in dotted lines. Fig. 6 is a section taken on the line 6—6 of Fig. 5, showing the patch built up in layers.

In the drawings, 1 are forms or blankets made of one or more layers of rubberized fabric, with a plurality of cup-shaped depressions therein as shown at 6, and 2 represents the patches. 3 is a non-curable rubber pad interposed between two sets of forms and patches to keep the forms from sticking together during vulcanizing. 4 is the top, and 5 the bottom plate of a steam press, in which the patches are cured. The object of the depressions 6 is to give to the patch the shape of a section of a tire. The patches are given this shape when compressed in the steam press, which forms the patches to the shape of a tire, by depressions 7 and projections 8 on the same.

The operation is as follows:

One of the forms or blankets 1 is first given a coat of rubber cement. This is left to stand until the cement is in a semi-hardened condition. A plurality of patches are then placed on the forms, bridging the depressions 6. Around the edges, these patches adhere to the cemented blanket very firmly, on account of the tacky nature of said semi-hardened cement. When the blankets and patches are put under compression in the steam press, the edges of said patches will remain stationary and the inner portions will stretch to conform to the shape of the blankets. The patches are vulcanized while under compression and are given their proper shape. After curing, the patches are stripped from the blanket. The above mentioned rubber cement adheres to the patches wherever they touch it, so that on one side, they have a coat of rubber. After the patches are stripped from the blanket, the remaining cement is cleaned from the blanket.

The drawings show two sets being cured at the same time, although it is obvious that one may be cured as well as two.

It will be readily seen by any one skilled in the art, that this is a much improved method of curing patches. It does away with the use of cores, the wrapping of the cores with tape, and various other operations, such as the various handlings of said cores.

It will be understood that various changes and modifications may be made without departing from the spirit of the invention, or sacrificing any of its benefits.

We claim:

1. In an apparatus for curing blow-out patches, a plurality of forms or blankets having cup-shaped depressions therein, a non-curable rubber pad, a steam press, having upper and lower plates, having mating projections and depressions thereon.

2. In an apparatus for curing blow-out patches, a vulcanizing press, having upper and lower plates provided with mating projections and depressions, a non-curable rubber pad between said plates, and a blanket between the pad and the plate, said blanket being formed with projections and depressions corresponding to the projections and depressions on the plate.

3. In an apparatus for curing blow-out patches, a vulcanizing press, having upper and lower plates provided with mating projections and depressions, a non-curable rubber pad between said plates, and blankets on either side of said pad, said blankets being provided with projections and depressions corresponding to the projections and depressions on the plate.

4. The method of manufacturing concavo-convex articles of rubber and fabric comprising, forming the articles uncured in flat condition, cementing the edges of the articles entirely around a concave depression, the central portion of said articles being flat and bridging the depression, forcing the center of the article into the depression while its edges remain cemented to the edges of the depression whereby the central portion of the fabric is stretched, and vulcanizing the articles while in stretched condition.

THOS. W. BEAN.
T. J. HENNESSY.

Witnesses:
R. B. TERV,
GERTRUDE MILLER.